United States Patent
Makinwa

(10) Patent No.: US 6,271,836 B1
(45) Date of Patent: Aug. 7, 2001

(54) METHOD OF DETERMINING THE PEN VELOCITY ALONG A GRAPHIC TABLET, AND GRAPHIC TABLET SUITABLE FOR CARRYING OUT THE METHOD

(75) Inventor: Kofi Makinwa, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 08/948,474

(22) Filed: Oct. 10, 1997

(30) Foreign Application Priority Data

Oct. 11, 1996 (EP) .................................................. 96202841

(51) Int. Cl.⁷ ..................................................... G09G 5/00
(52) U.S. Cl. ........................................... 345/173; 345/179
(58) Field of Search ..................................... 345/173–174, 345/104, 177, 179; 178/18.01–18.05, 19.01–19.04

(56) References Cited

U.S. PATENT DOCUMENTS

| | | | |
|---|---|---|---|
| 3,699,517 | * 10/1972 | Dyche ............................. 340/146.3 |
| 4,568,799 | * 2/1986 | Kobayashi et al. ..................... 178/19 |
| 4,616,106 | * 10/1986 | Fowler et al. ........................ 178/18 |
| 4,686,332 | 8/1987 | Greanias et al. ....................... 178/19 |
| 5,053,757 | 10/1991 | Meadows ............................. 340/712 |
| 5,073,685 | * 12/1991 | Kobayashi et al. ..................... 178/18 |
| 5,229,551 | 7/1993 | McDermott et al. .................... 178/18 |
| 5,231,381 | 7/1993 | Duwaer .............................. 340/712 |
| 5,327,161 | * 7/1994 | Logan et al. ........................ 345/173 |
| 5,347,589 | * 9/1994 | Meeks et al. ...................... 178/18.01 |
| 5,402,151 | 3/1995 | Duwaer .............................. 345/173 |
| 5,491,706 | * 2/1996 | Tagawa et al. ....................... 345/104 |
| 5,526,023 | * 6/1996 | Sugimoto et al. ..................... 345/173 |
| 5,534,892 | * 7/1996 | Tagawa .............................. 345/174 |
| 5,561,613 | * 10/1996 | Kobayashi et al. ..................... 178/18 |
| 5,587,558 | * 12/1996 | Matsushima ......................... 345/173 |
| 5,818,249 | * 10/1998 | Tanaka et al. ....................... 345/173 |

FOREIGN PATENT DOCUMENTS

0622754A1 11/1994 (EP) .
WO9626481 8/1996 (EP) .
WO9626499 8/1996 (EP) .

* cited by examiner

Primary Examiner—Richard Hjerpe
Assistant Examiner—Duc Dinh

(57) ABSTRACT

The invention relates to the determination of the velocity of a conductive pen 102 along a graphic tablet 100. Generation of successive pulses in successive conductors, arranged in a regular pattern in the tablet, produces an electromagnetic signal in a conductive pen situated in the vicinity of the tablet. When the pen is near the writing surface of the tablet, the pen signal exhibits a local maximum which is indicative of the location of the pen. The distance between the edges to both sides of this local maximum constitutes an indication of the velocity of the pen.

25 Claims, 2 Drawing Sheets

METHOD OF DETERMINING THE PEN VELOCITY ALONG A GRAPHIC TABLET, AND GRAPHIC TABLET SUITABLE FOR CARRYING OUT THE METHOD

The invention relates to a method of determining a velocity of a pen in a direction along a graphic tablet, provided with a regular pattern of conductors, by measurement of an electromagnetic signal caused in the pen by a series, being a succession of elements, each element consisting of successive electric pulses generated in respective conductors and each element of the series causing in the pen a pen signal which is a combination of responses to the pulses of this element.

The invention further relates to a graphic tablet provided with a pen, a regular pattern of conductors and a first drive unit for generating a first series, being a succession of elements, each element consisting of successive electric pulses in respective conductors, each element of the first series causing in the pen a respective pen signal which is a combination of responses to the pulses of this element Graphic tablets are widely used as data input devices. By positioning a pointing means (referred to hereinafter as pen) at or near a specific area on the tablet, the user can trigger a given action in a manner which is experienced as being natural. Generally speaking, a graphic tablet is integrated with an LCD display screen. A first possible use of such a combination is to reproduce symbols on the display screen which represent user options which the user can select by means of the graphic tablet by positioning the pen in the vicinity of such a symbol. A second possible use is the input of text, for example for a word processing application where text is input by writing the text on the tablet by means of the pen. Accurate determination of the position of the pen along the tablet is important for both possible uses.

According to U.S. Pat. No. 5,229,551, not only the position but also the velocity of the pen is determined. This is because the velocity information can be used to achieve more accurate determination of the position. Because the pen positions are determined successively in two directions, a kind of hysteresis effect occurs. Compensation for this effect can be achieved by utilizing a correction algorithm having the pen velocity as one of its parameters.

It follows from the cited Patent that the pen position is determined in first instance by generating a succession of pulses in respective conductors, arranged in a matrix pattern, the pen position being derived from a pen signal arising as a consequence of these pulses. The pen velocity in a direction along the tablet is subsequently derived from a number of successive pen positions thus determined. Finally, this velocity information is used to compensate for said hysteresis effect. It is a drawback of this indirect method of determining the velocity that the measurements are not efficiently used.

It is inter alia an object of the invention to provide a method of the kind set forth which utilizes the information contained in the pen signal more efficiently. To this end, a method according to the invention is characterized in that the pen velocity in said direction is derived from the shape of the pen signal to both sides of a local maximum in the pen signal. It has been found experimentally that the shape of the pen signal is velocity-dependent.

A graphic tablet according to the invention is characterized in that the graphic tablet is provided with a detection unit for deriving a pen velocity in a first direction along the tablet from the shape of the pen signal to both sides of a local maximum in the pen signal.

An advantage of the invention, demonstrated in the preferred embodiment of the invention, consists in that the samples generated for the determination of one position in one direction suffice to determine the velocity in the same direction. Therefore, the determination of the velocity in that direction does not require a second position determination. Moreover, the information in the pen signal is utilized better and the trajectory of the pen along the tablet can be accurately determined, while using fewer measured pen positions, by utilizing interpolation on the basis of the velocity information also obtained. The velocity information can also be used to activate adaptive filtering of the pen signal, before extraction of the pen position, in order to suppress noise. This application of the velocity information is disclosed in U.S. Pat. No. 5,053,757. Information concerning the pen velocity may also be useful for aspects other than accurate position determination, for example for the recognition of handwriting.

Further attractive aspects of the invention are disclosed in the dependent claims. Relevant prior art is given in U.S. Pat. No. 5,231,381 (PHN 13.100) and U.S. Pat. No. 5,402, 151 (PHN 13.100) and European Patent Applications EP-A 0 756 733 and EP-A 0 756 723, corresponding to U.S. patent applications Ser. No. 08/602,547 (PHN 15.210) and Ser. No. 08/603,958 (PHN 15.209) in the name of Applicant.

The invention will be described in detail hereinafter with reference to some Figures which show notably a preferred embodiment.

Figure 1:
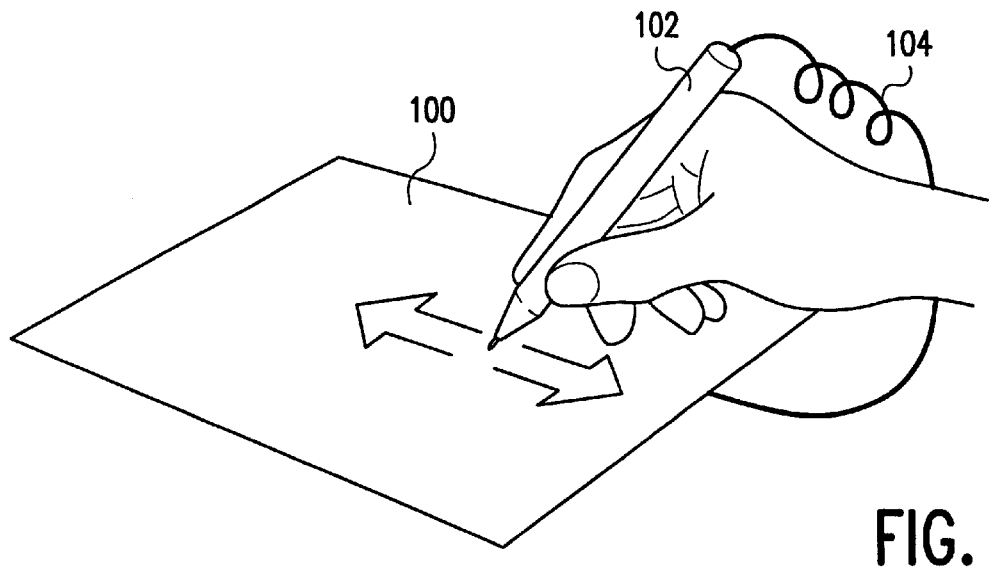
FIG. 1 illustrates a graphic tablet with a pen forming part thereof.

FIG. 1 shows an embodiment of a graphic tablet 100. The tablet is connected to the pen 102 via a conductive wire 104. By manipulation of the pen 102, a user can enter data for a data processing unit (not shown) which is connected to or integrated with the tablet 100.

Figure 2:
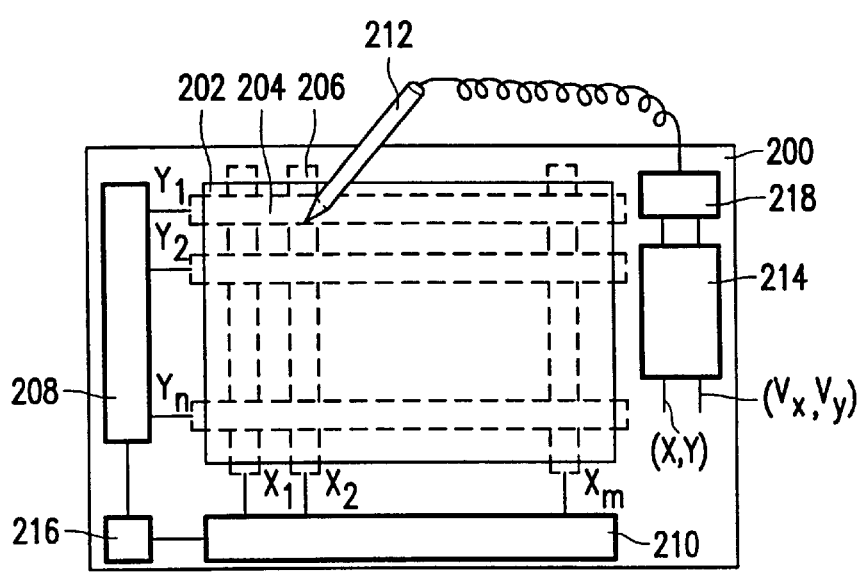
FIG. 2 shows diagrammatically a preferred embodiment of the tablet.

FIG. 2 shows diagrammatically the construction of a graphic tablet in which a preferred version of the method of the invention is used. The tablet 200 includes an LCD display screen 202 which is provided with a pattern of conductors which consists of mutually insulated rows 204 and columns 206 which extend perpendicularly to one another. In conformity with the VGA standard, there are 525 rows and 640 columns in total and the pixel size is approximately 0.3 mm. This pattern of conductors is driven by a first drive unit or row driver 208 and a second drive unit or column driver 210 which are capable of driving each row and each column by means of a given pulse shape. The operation of the row driver 208 and the column driver 210 is under control of control unit 216.

The pattern of conductors serves first of all to generate images on the LCD display screen at a frequency of 60 Hz. Various principles are known for generating an image in an LCD display screen provided with a pattern of conductors as shown in FIG. 2. These principles have in common that an image is produced by generating the appropriate signals in the pattern of conductors.

The pattern of conductors is also suitable for supplying detection signals for determining the position of the pen 212. At one end the pen 212 is provided with a conductive ball in which a pen signal arises due to capacitive coupling of voltages in the pattern of conductors, the desired information being derived from said pen signal by means of a position and velocity detection unit 214. The pen signal is sufficiently strong only if the end accommodating the ball is held sufficiently close to the tablet. The supply of the detection signals and the signals for the display screen function can take place in time multiplex (as described in U.S. Pat. No. 4,686,332) or partly simultaneously (as described in EP-A 0 622 754); in the latter case the position of the pen is determined in one direction by means of the same signals as required for generating the image. It is to be noted that the specific integration of graphic tablet and display screen function is irrelevant to the invention.

An adaptive low-pass filter 218 is included for filtering the pen signal, the degree of filtering being a function of the pen velocity as determined by detection unit 214.

Figure 3:
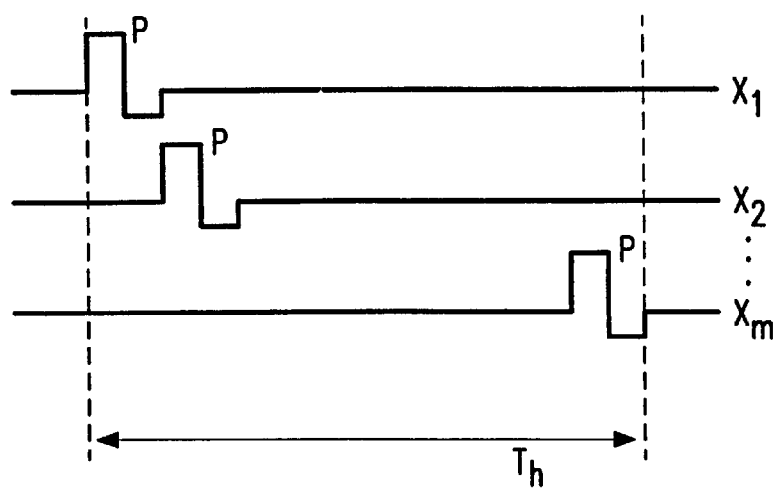
FIG. 3 shows detection signals used in the preferred embodiment.

The position and the velocity in the horizontal direction, i.e. parallel to the rows, in this embodiment is determined by letting column driver 210 successively drive the columns $x_1$ to $x_m$ with a succession of pulses P as shown in FIG. 3. Such a succession of pulses in respective conductors is here referred to as an element. Successive elements constitute a series. The timing of each element is controlled by the control unit 216. In a fixed time interval $T_h$ all columns are thus driven, whereby the time dependence of the pulses in the respective columns is known exactly. For an accurate determination of the position it is desirable that, during normal operation, within the time interval $T_h$ the pen will only move a small distance. In practice this imposes an upper limit on $T_h$ of about 20 ms.

In other embodiments, preference may be given to the non-driving of some columns or to the simultaneous driving of a few neighbouring columns. Furthermore, successive elements of a series need not be the same. For example, it is possible to drive first all even and subsequently all odd columns, or first the columns $x_1$ to $x_m$ and subsequently the columns $x_m$ to $x_1$. Other pulse shapes are also feasible, notably if the pulses are also used for generating an image on the LCD display screen and the construction of the LCD display screen imposes a specific pulse shape.

Figure 4:
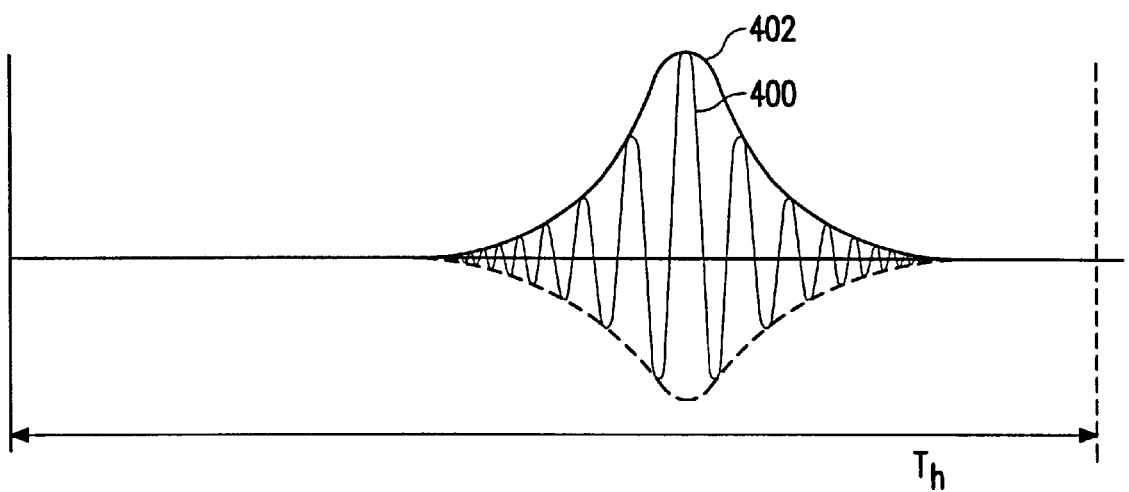
FIG. 4 shows an example of a pen signal associated with the preferred embodiment.

FIG. 4 gives an impression of the shape of the pen signal 400 generated in the pen by capacitive coupling due to the pulses of the element in the preferred embodiment. The envelope 402 of the pen signal is bell shaped. The columns situated nearest to the pen upon application of the pulses make the largest contribution to the pen signal. The point in time at which the envelope of the pen signal is maximal is determined in the detection unit 214 of FIG. 2 on the basis of a successively rectified, filtered and sampled version of the pen signal. The column being closest to the pen during the application of the pulses, and thus the value of the pen position in the horizontal direction, can then be simply derived via the known time-dependency of the applied pulses.

Figure 5:
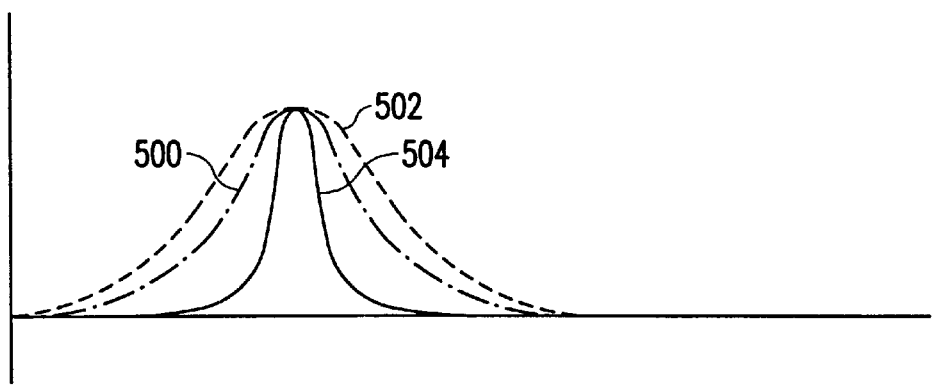
FIG. 5 shows the effect of pen velocity on the pen signal of the preferred embodiment.

FIG. 5 shows the effect of a horizontal pen motion during the driving of the columns by said pulses. Curve 500 is the pen signal measured in the rest state of the pen. The width of the bell-shaped part of the envelope of the pen signal varies as a function of the horizontal pen velocity. When the pen moves towards column $x_m$, the columns to both sides of the column making the largest contribution to the pen signal will be situated nearer to the pen at the instant at which they are driven. They thus make a comparatively larger contribution to the pen signal than when the pen is in the rest state. Thus, the bell shape is widened (curve 502). Exactly the opposite situation occurs when the pen moves towards column $x_1$. The columns to both sides of the column making the largest contribution to the pen signal will then be situated further from the pen when they are driven. They thus make a comparatively smaller contribution to the pen signal than when the pen is in the rest state. The bell shape is thus narrowed (curve 504). A succession of pulses through respective columns other than that of this preferred embodiment will also introduce such a velocity-dependent effect in the pen signal. Detection unit 214 of FIG. 2 determines the width of the bell shape from the same samples as obtained for the horizontal position determination. To this end, detection unit 214 determines at both the rising and the falling edge of the bell shape the point in time at which the bell shape attains half its maximum value. The distance in time between the two samples thus found is a measure for the width of the bell shape. Subsequently, detection unit 214 compares the obtained value with a table from which both magnitude and direction of the horizontal velocity follow. Other methods for deducting the horizontal velocity from the width are possible, for instance with the aid of an experimentally obtained formula.

In the preferred embodiment, the pen signal resulting from a single element is sufficient for determining position and velocity along one direction. Repeating this process gives rise to a series of elements.

It is to be noted that the fact that the tablet has finite dimensions disturbs the symmetry of the bell shape. This asymmetry is not shown in the drawings. In another embodiment of the invention, this asymmetry could be used to determine the pen velocity.

The position and the velocity of the pen in the vertical direction, i.e. parallel to the columns, is determined analogously by means of the rows $y_1$ to $y_n$ and a second series. The position and velocity information obtained, denoted in FIG. 2 by the references (x,y) and ($v_x,v_y$), respectively, can be used in a tablet in the previously described manner or be applied to the previously mentioned data processing unit.

What is claimed is:

1. A method of determining a velocity of a pen in a direction along a graphic tablet, provided with a regular pattern of conductors, comprising: measuring an electromagnetic signal caused in the pen by a series, being a succession of elements, each element consisting of successive electric pulses generated in respective conductors and each element of the series causing in the pen a pen signal which is a combination of responses to the pulses of this element, and deriving the pen velocity in said direction from the shape of the pen signal to both sides of a local maximum in the pen signal.

2. A method as claimed in claim 1, further comprising calculating the pen velocity in said direction from the distance between the two edges to both sides of the local maximum in the pen signal.

3. A method as claimed in claim 1, further comprising deriving a position of the pen in said direction from the location of the local maximum of the pen signal.

4. A method as claimed in claim 3, further comprising successively determining pen positions in a first and in a second direction, together with associated pen velocities, the second direction extending transversely of the first direction, replacing the determined pen position in one direction by an estimate of the pen position in that direction at the instant of measurement of the other pen position, said estimate being made on the basis of the determined pen positions and pen velocities, so that two pen positions are obtained in two different directions associated with the same instant.

5. A graphic tablet provided with a pen, comprising: a regular pattern of conductors and a first drive unit for generating a first series, being a succession of elements, each element consisting of successive electric pulses in respective conductors, each element of the first series causing in the pen a respective pen signal which is a combination of responses to the pulses of this element, wherein the graphic tablet is provided with a detection unit for deriving a pen velocity in a first direction along the tablet from the shape of the pen signal to both sides of a local maximum in the pen signal.

6. A graphic tablet as claimed in claim 5, wherein the detection unit is arranged to determine the pen velocity in the first direction from the distance between the two edges to both sides of the local maximum in the pen signal.

7. A graphic tablet as claimed in claim 6, wherein the graphic tablet and the pen are suitable for capacitive transfer of electric voltages in said pattern of conductors to the pen, resulting in said pen signal.

8. A graphic tablet as claimed in claim 7, wherein said pattern of conductors comprises a first set of parallel, straight conductors in a plane extending parallel to the tablet, the direction of the conductors extending transversely of the first direction, and the first drive unit is arranged to generate the first series in the first set of conductors.

9. A graphic tablet as claimed in claim 8, wherein said pattern of conductors comprises a second set of parallel conductors, extending transversely of the first set, the graphic tablet comprises a second drive unit for generating a second series in the second set of conductors, and the detection unit is arranged to determine a pen velocity in a second direction along the tablet in a manner analogous to the determination of the pen velocity in the first direction.

10. A graphic tablet as claimed in claim 5, wherein the detection unit is arranged to derive a position of the pen in the first direction along the tablet from the location of a local maximum of the pen signal caused by an element of the first series, and the detection unit is arranged to derive a position of the pen in the second direction along the tablet from the location of a local maximum of a pen signal caused by an element of the second series.

11. A graphic tablet as claimed in claim 10, wherein the detection unit is arranged to determine the pen positions and the pen velocities successively in the first and in the second direction, and to replace subsequently the determined pen position in one direction by an estimate of the pen position in that direction at the instant of measurement of the pen position in the other direction, so that two pen positions are obtained in two different directions associated with one and the same instant.

12. A graphic tablet as claimed in claim 5, further comprising an adaptive low-pass filter for filtering the pen signal, the degree of filtering of which being a function of the pen velocity.

13. A method of determining a velocity of a pen in a direction along a graphic tablet having a regular pattern of conductors, comprising:

applying successive electrical pulses in respective conductors;

sampling a pen signal arising from capacitive coupling of the pen to the conductors, wherein samples of the pen signal define a signal shape; and deriving the pen velocity from the signal shape ranging from before to after a local maximum sample value of the samples of the pen signal.

14. The method of claim 13, wherein the maximum sample value has a sample time and further comprising:

determining respective times before and after the time of the maximum sample value at which respective sample values are less than the maximum sample value by a quantity that is a function of the maximum sample value; and deriving the pen velocity from a difference between the respective times before and after the time of the maximum.

15. The method of claim 14, wherein the sample values at the respective times before and after the time of the maximum sample value are approximately one-half the maximum sample value.

16. The method of claim 13, further comprising deriving a position of the pen from the time of the maximum sample value.

17. The method of claim 13, wherein the signal shape is generally a bell curve and the velocity of the pen is derived from the width of the bell curve.

18. The method of claim 16, further comprising:

detecting velocity in a first direction if the width is less than a threshold width; and detecting velocity in a second direction if the width is greater than the threshold width.

19. An apparatus for determining a velocity of a pen in a direction along a graphic tablet having a regular pattern of conductors, comprising:

means for applying successive electrical pulses in respective conductors;

means for sampling a pen signal arising from capacitive coupling of the pen to the conductors, wherein samples of the pen signal define a signal shape; and means for deriving the pen velocity from the signal shape ranging from before to after a local maximum of the samples of the pen signal.

20. A system for determining a velocity of a pen in a direction along a graphic tablet, comprising:

a regular pattern of conductors;

a first drive unit coupled to the conductors and arranged to generate successive electrical pulses to the conductors;

a detection unit coupled to the pen, the detection unit configured and arranged to sample a signal from the pen arising from capacitive coupling of the pen to the conductors, wherein samples of the pen signal define a signal shape, the detection unit further configured to derive the pen velocity from the signal shape ranging from before to after a local maximum sample value of the samples of the pen signal.

21. The system of claim 20, wherein the maximum sample value has a sample time and the detection unit is further configured and arranged to determine respective times before and after the time of the maximum sample value at which respective sample values are less than the maximum sample value by a quantity that is a function of the maximum sample value, and derive the pen velocity from a difference between the respective times before and after the time of the maximum.

22. The system of claim 21, wherein the sample values at the respective times before and after the time of the maximum sample value are approximately one-half the maximum sample value.

23. The system of claim 20, wherein the detection unit is further configured and arranged to derive a position of the pen from the time of the maximum sample value.

24. The system of claim 20, wherein the signal shape is generally a bell curve and the velocity of the pen is derived from the width of the bell curve.

25. The system of claim 24, wherein the detection unit is further configured and arranged to detecting velocity in a first direction if the width is less than a threshold width, and detect velocity in a second direction if the width is greater than the threshold width.

* * * * *